(12) United States Patent  (10) Patent No.: US 7,461,516 B2
Leadingham et al.  (45) Date of Patent: Dec. 9, 2008

(54) MODULAR AIRCRAFT GROUND SUPPORT CART

(75) Inventors: David W. Leadingham, Bradenton, FL (US); Steve Bivens, St. Pete Beach, FL (US); Richard L. Hansen, Parrish, FL (US)

(73) Assignee: Illinois Tool Works Inc., Glenview, IL (US)

( * ) Notice: Subject to any disclaimer, the term of this patent is extended or adjusted under 35 U.S.C. 154(b) by 343 days.

(21) Appl. No.: 11/285,233

(22) Filed: Nov. 22, 2005

(65) Prior Publication Data

US 2008/0250803 A1  Oct. 16, 2008

(51) Int. Cl.
*F25D 15/00* (2006.01)

(52) U.S. Cl. .............................. 62/236; 62/237; 62/239; 363/143

(58) Field of Classification Search ................... 62/236, 62/237, 239, 323.1; 363/143
See application file for complete search history.

(56) References Cited

U.S. PATENT DOCUMENTS

| | | | | |
|---|---|---|---|---|
| 2,053,206 A | * | 9/1936 | Sargent | .......................... 62/230 |
| 2,521,814 A | * | 9/1950 | Waters | .......................... 426/393 |
| 6,046,921 A | * | 4/2000 | Tracewell et al. | ........... 363/141 |
| 6,218,796 B1 | * | 4/2001 | Kozlowski | ................... 318/280 |
| 6,384,488 B1 | * | 5/2002 | Bucharelli et al. | ............ 307/9.1 |
| 6,424,891 B1 | * | 7/2002 | Sargent et al. | ................. 701/29 |
| 6,477,248 B1 | * | 11/2002 | Bruhnke et al. | ......... 379/399.01 |
| 6,503,649 B1 | * | 1/2003 | Czajkowski et al. | ........... 429/23 |
| 2004/0160216 A1 | * | 8/2004 | Speranza et al. | ............. 320/140 |

FOREIGN PATENT DOCUMENTS

| | | |
|---|---|---|
| DE | 34 23 867 | 1/1986 |
| DE | 296 22 089 | 4/1998 |

OTHER PUBLICATIONS

PCT International Search Report and Written Opinion (Mar. 13, 2007).

* cited by examiner

*Primary Examiner*—William E Tapolcai
(74) *Attorney, Agent, or Firm*—Fletcher Yoder

(57) ABSTRACT

A modular aircraft support system is disclosed. In one embodiment, the modular system includes a mobile cart and an air conditioning system configured to provide conditioned air to an aircraft. The embodiment also includes a modular power converter for converting input power to a desired output power, which can be input to a supported aircraft. The cart is configured to receive a plurality of different interchangeable power converters, such as a 115 VAC, 400 Hz power converter or a 270 VDC power converter. In some embodiments, a variety of other components are also coupled to the mobile cart, including a local generator and engine. The generator may supply power to the air conditioning system and to the converter.

22 Claims, 7 Drawing Sheets

MODULAR AIRCRAFT GROUND SUPPORT CART

BACKGROUND

The invention relates generally to ground support equipment for aircraft. More specifically, the present invention relates to a modular support cart for providing electric power and conditioned air to an aircraft.

In the aviation industry, a wide variety of ground support equipment is available to provide electrical power and conditioned air, among other things, to aircraft. As will be appreciated, many aircraft are capable of generating their own electric power, such as through the use of onboard generators powered by engines of a particular aircraft. However, because of fuel consumption, it is generally desirable to disable such engines when an aircraft will be stationary on the ground for any sustained period.

Because the internal power generation systems of such aircraft depend on the operation of the engines, and because aircraft are rarely configured to directly interface with power ordinarily available at a facility, external ground power units (GPUs) or carts including power converters are frequently used to supply electric power to components and systems of aircraft when the aircraft engines are disabled. For instance, GPUs may be advantageously utilized to provide electric power to aircraft parked at terminals, in hangers, on runways, or some other location, which facilitates operation of a number of aviation systems, including communications systems, lighting systems, avionics, air conditioning systems, and the like, while the aircraft engines are powered down. Additionally, the power provided by GPUs may supplement power provided during operation of the engines while an aircraft is on the ground. Further, other ground equipment or carts can be utilized to provide conditioned air to the environmental control systems of an aircraft to enable temperature regulation of the cockpit, the cabin, storage areas, and components of the aircraft.

However, as will be appreciated by one skilled in the relevant art, not all aircraft are designed to utilize power having the same characteristics. For instance, some aircraft utilize alternating current power, while others utilize direct current power. Further, even if two aircraft use power having the same type of current, such as direct current, the two aircraft may use power having different voltage characteristics from one another. Because present ground power units are configured to produce a specific output power, it is presently necessary to have a separate ground power unit or cart for each aircraft power standard that may be encountered. Currently, there is little alternative but to design, build and operate ground power units specifically designed to provide one type of power or another. Where multiple aircraft of different types are to be supported, different support equipment has typically been required. However, buying, providing and maintaining separate carts for each power standard is inefficient, and increases the costs associated with supporting a variety of aircraft.

There is a need, therefore, for an improved ground support cart for aircraft that allows the cart to provide power and conditioned air to a wide variety of aircraft, which may have different power requirements and standards, in an economical and efficient manner.

BRIEF DESCRIPTION

The present techniques provide various modular ground support systems for aircraft, such as airplanes, helicopters, unmanned aerial vehicles (UAVs), and the like. In one embodiment, the support cart includes an air conditioning system and a power converter coupled to a frame. The power converter and air conditioning system are capable of providing power and air, respectively, to an aircraft. In certain embodiments, the power converter may be configured to receive power from an external power source. However, in other embodiments, the modular cart may include an engine-generator set to provide input power locally. Notably, the cart is configured to facilitate interchangeability of a plurality of power converters within the cart. For instance, a first power converter may be installed within the modular cart to provide power to aircraft requiring a specific type of power. However, the first power converter may be removed and replaced by a second power converter providing output power with different characteristics to facilitate support of other types of aircraft with different power needs. In various embodiments, other components and modules may be added to the modular cart. Further, in one embodiment, switchgear is provided to allow selection between a local (i.e., mobile) and an external power source for providing input power to the components installed on the cart.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
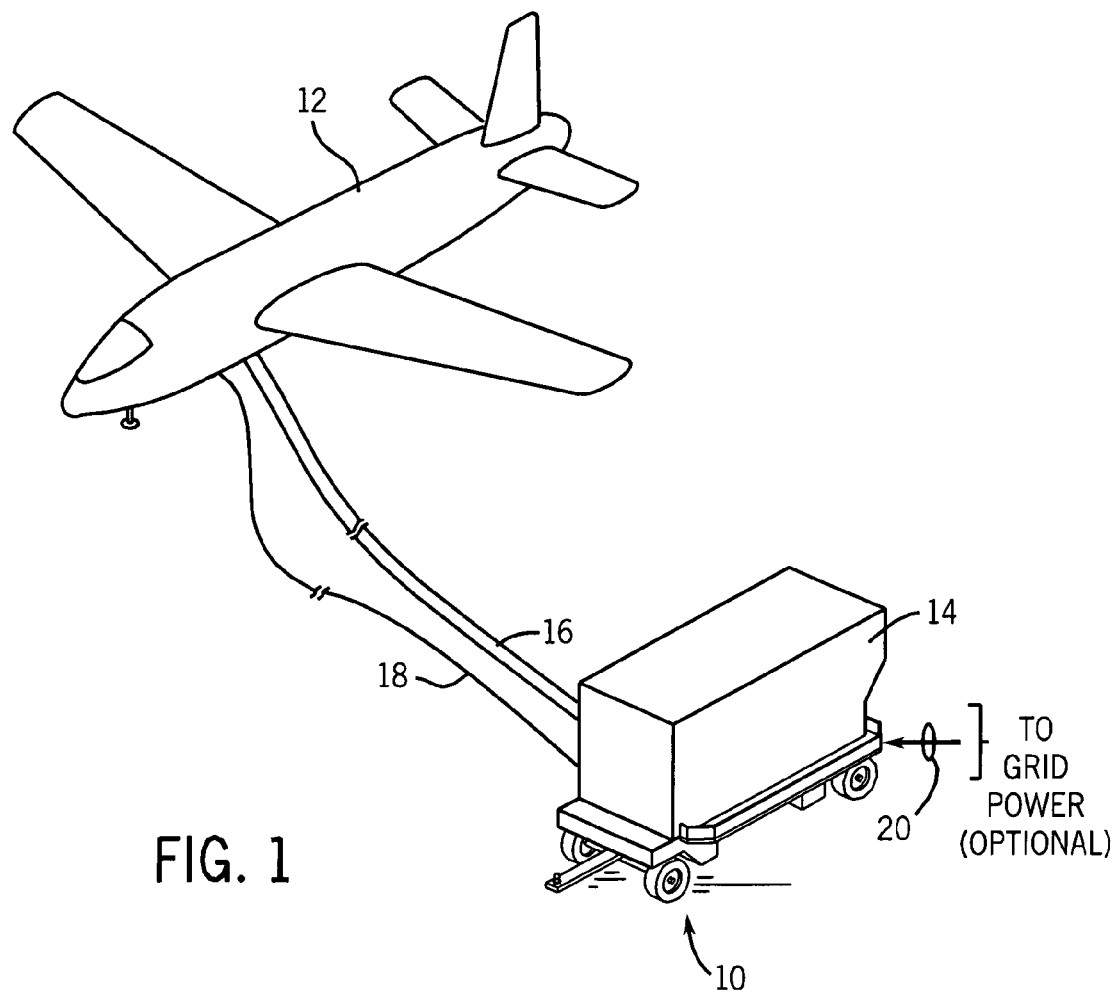
FIG. 1 is a perspective view of an aircraft coupled to an exemplary modular ground support cart in accordance with the present techniques.

Turning now to the figures, FIG. 1 illustrates a modular support system 10 for a vehicle, such as an aircraft 12. In the presently illustrated embodiment, system 10 includes a cart 14 capable of supporting aircraft 12 by providing conditioned air, power, and the like to the aircraft. For instance, conditioned air may be provided from cart 14 to aircraft 12 through an airflow conduit 16. Similarly, cart 14 may provide output power to aircraft 12 via a power cable 18. In one embodiment, power may be supplied to cart 14 from an external power source or grid by way of an input power cable 20. However, as described in greater detail below, cart 14 may also include an internal power source that provides power instead of, or in addition to, that provided externally from cable 20.

Figure 2:
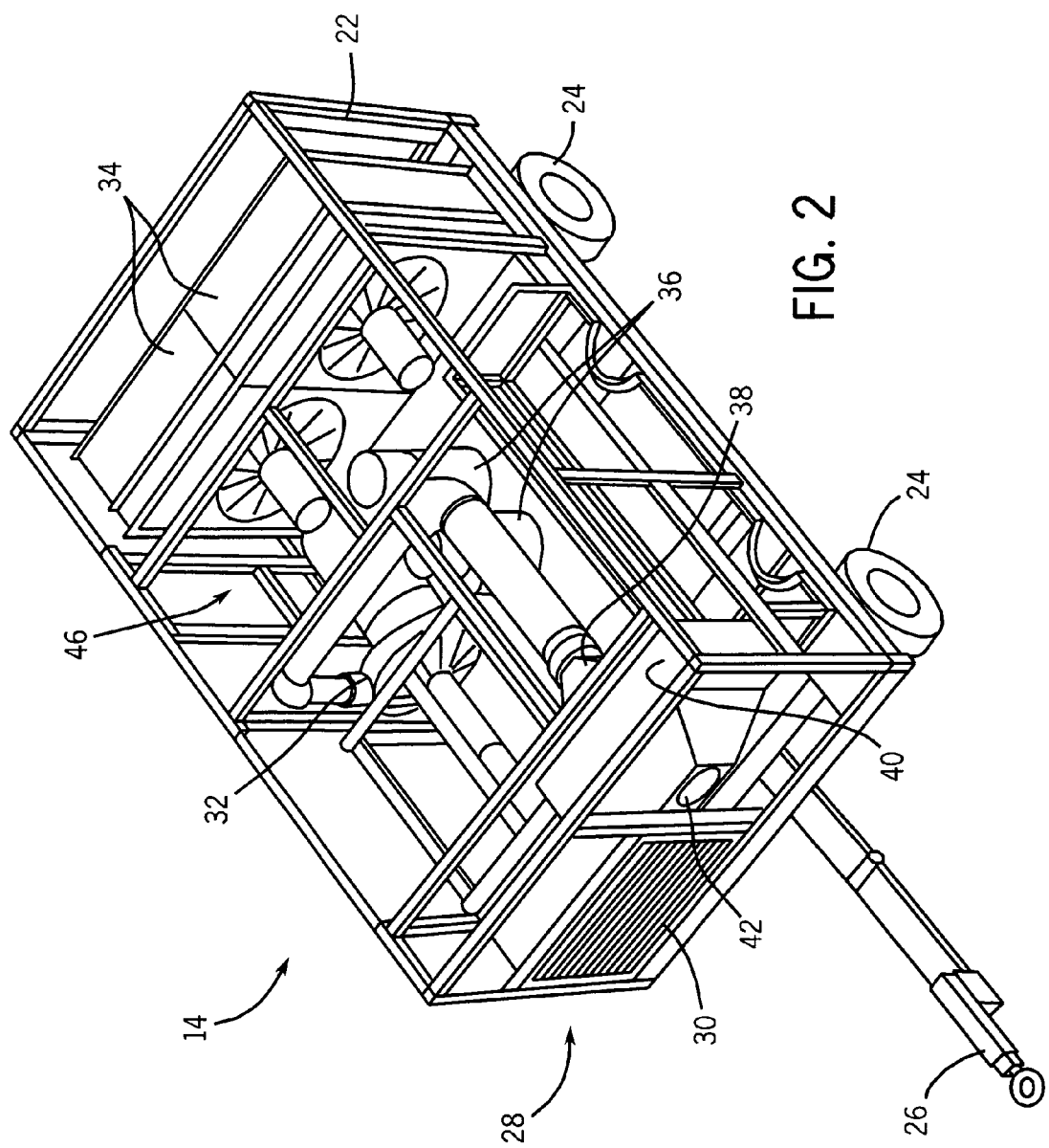
FIG. 2 is a perspective view of the modular ground support cart of FIG. 1, in accordance with one embodiment of the present techniques.
Figure 3:
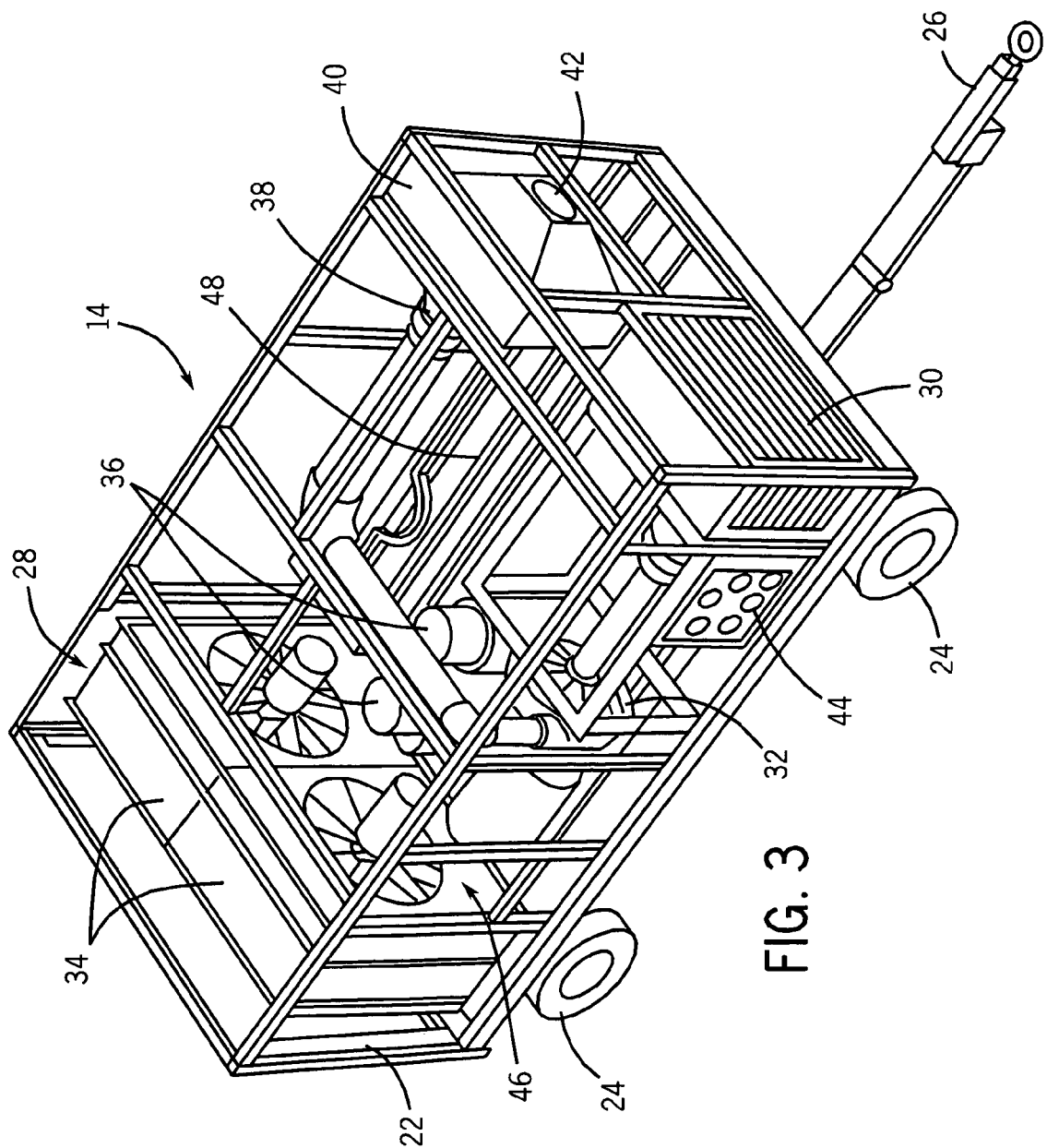
FIG. 3 is an alternative perspective view illustrating additional features of the support cart provided in FIG. 2.

One embodiment of a modular support cart 14 for providing conditioned air to aircraft 12 is provided in FIGS. 2 and 3. Support cart 14 generally includes a structural frame 22 which is configured to receive a plurality of modules or systems. In the illustrated embodiment, the modular support cart 14 also includes wheels 24 and towbar 26 to facilitate movement and otherwise increase the mobility of the cart. However, in other embodiments the cart 14 may be configured without wheels for mounting to the chassis of a vehicle, such as a truck. It should be noted that in the several views and alternative configurations shown, enclosure or cover panels have been removed to reveal the various modular components supported in the cart. In general, however, once fully assembled, the cart will present a rugged shell that encloses these elements, protects them during use, and prevents access to them. As will be appreciated by those skilled in the art, locking access panels, vented shrouds, and the like may form part of this enclosure, particularly where the cart includes a generator set powered by an internal combustion engine, as described below.

As noted above, frame 22 is configured to receive a number of modules or systems, including an air conditioning system 28. As will be appreciated, air conditioning system 28 may include a variety of components. For instance, air conditioning system 28 may include an intake filter or conditioner 30, a blower 32, one or more condenser coils 34, one or more compressors 36, a discharge plenum 38, a downstream coil or heat removing device 40, a hose connection port 42, and a control panel 44. Further, in some embodiments, additional air conditioning system components, such as controllers, circuit breakers, or other circuitry, may be provided on or within cart 14, such as within volume 46. Additionally, cart 14 may include one or more hose storage elements 48 for receiving and managing hoses and cables associated with air conditioning system 28 and other components of cart 14.

It should be noted that, while one particular embodiment is illustrated herein, the particular configuration of air conditioning system 28 illustrated in FIG. 2 is merely provided for clarity and exemplary purposes. It will be appreciated that other arrangements of air conditioning system 28 may be utilized in full accordance with the presently disclosed techniques. Further, in one embodiment, air conditioning system 28 receives operating power from an external (i.e., remote) power source or grid via cable 20 as illustrated in FIG. 1. However, in alternative embodiments, air conditioning system 28 may instead receive power from a local power source coupled to frame 14.

Figure 4:
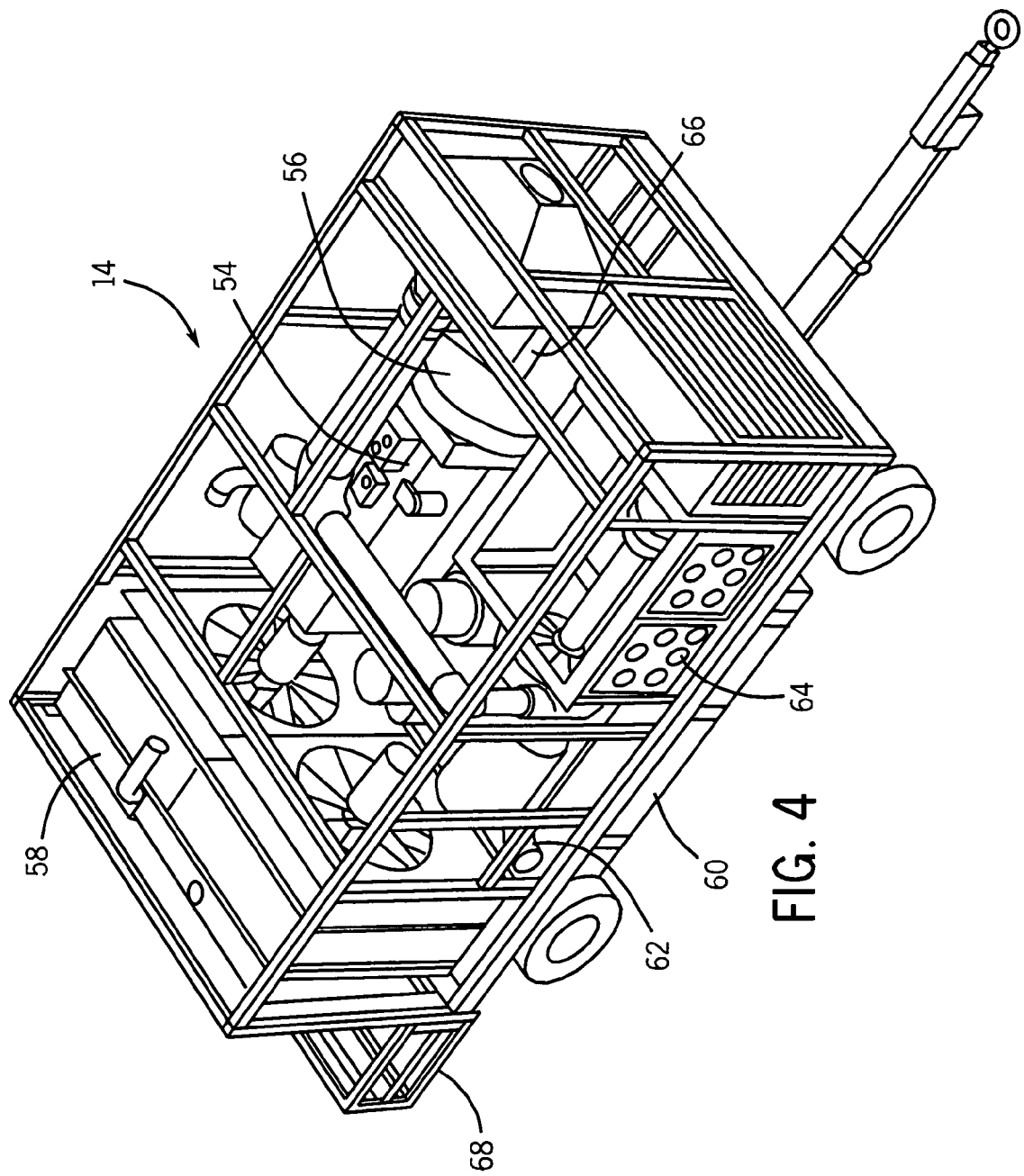
FIG. 4 is a perspective view of a modular ground support cart including an engine and generator in accordance with one embodiment of the present techniques.

For instance, in the embodiment illustrated in FIG. 4, cart 14 includes an engine 54, such as a diesel engine, coupled to a generator 56. As will be appreciated, engine 54 may be operated to provide mechanical power to elements of generator 56. The generator, in turn, converts the mechanical power received from engine 54 to electrical power that may be supplied to various components of cart 14, including air conditioning system 28. In one embodiment, generator 56 produces 3-phase 460 VAC power, at a frequency of 60 Hz, for powering air conditioning system 28 and other components of cart 14. In certain embodiments, generator 56 may also provide power to a step-down transformer configured to provide 120 VAC power at a frequency of 60 Hz to facilitate operation of a tool or device configured to receive standard household power. The generator may, of course, provide output at other standards, including at a rated 50 Hz, where desired. Output from the generator will typically be supplied to conditioning circuits, protective circuits (e.g., fuses, circuit breakers), and switchgear (e.g., contactors, disconnects) by way of cabling. Such cabling will also supply power to the air conditioning equipment and other components. These elements are not shown in the figures for the sake of clarity. In various embodiments, modular support cart 14 may include a variety of other systems and components that support the engine 54. For instance, in the presently illustrated embodiment, modular cart 14 includes a radiator and charge air cooler 58 for a turbocharger of engine 54, a fuel tank 60 for storing fuel provided via a fuel inlet port 62, an engine control panel 64, and a terminal box 66 for the generator 56. Further, cart 14 may also include a hose or cable basket 68 for storing various cables and hoses of cart 14. While a number of additional components are described herein, it will be appreciated that these components are shown and described here for exemplary purposes and the present techniques are not limited to these described components. Indeed, other components may be added to the modular support cart in accordance with the presently disclosed techniques.

Figure 5:
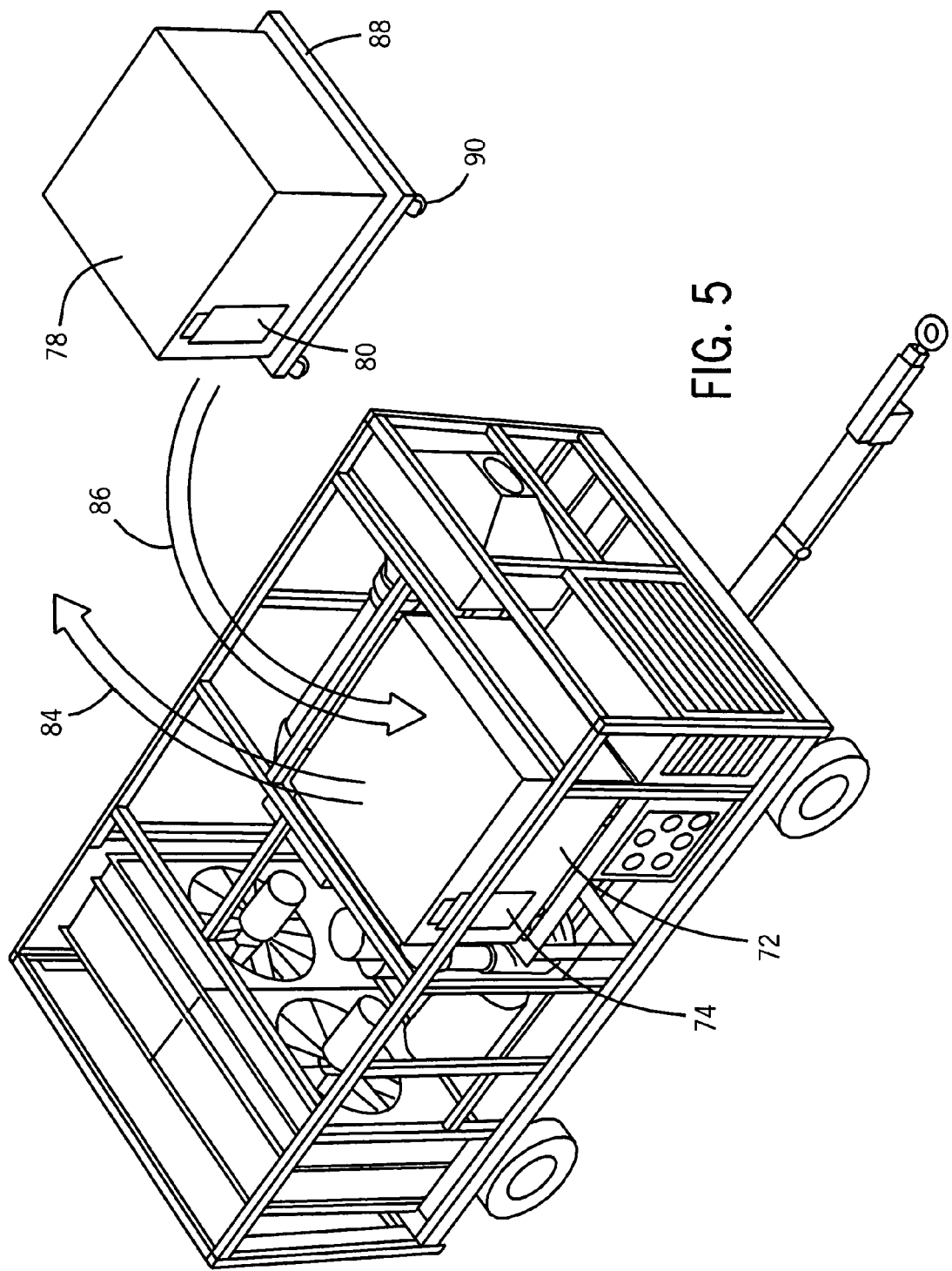
FIG. 5 is a perspective view illustrating the installation and removal of various power converter units from the modular ground support cart of FIG. 2, in accordance with the present techniques.
Figure 6:
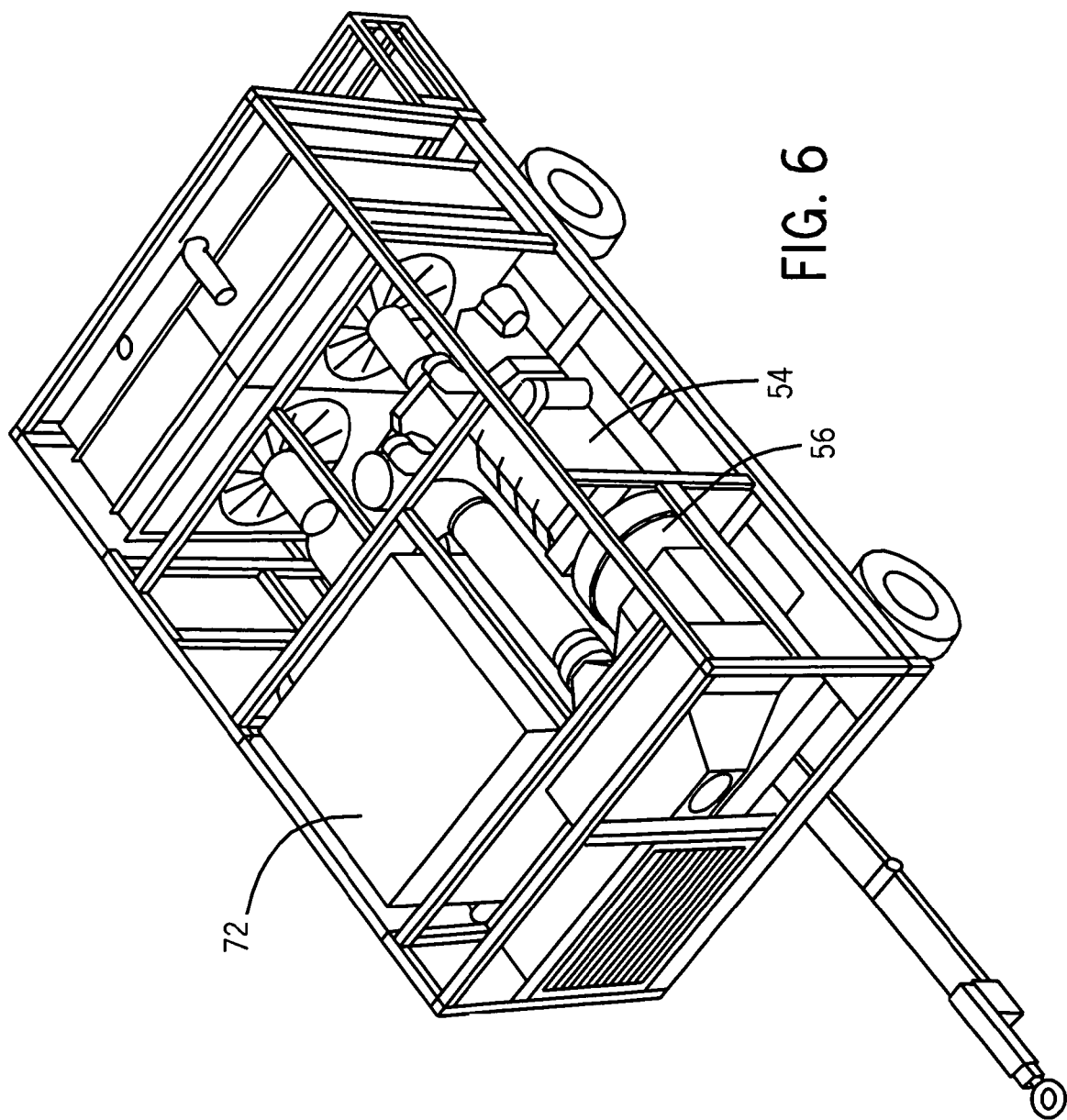
FIG. 6 is a perspective view of the modular ground support cart of FIG. 5, illustrating the inclusion of an engine and generator in accordance with one embodiment of the present techniques.

Notably, as depicted in FIGS. 5 and 6, modular support cart 14 is also configured to receive a power converter, such as power converter 72. Notably, power converter 72 includes a control panel 74 and receives input power, such as power externally routed to cart 14 via cable 20, or power generated by engine 54 and generator 56 as described above, and converts this input power to an output power having desired characteristics. With respect to the input power, it should be noted that while an engine 54 and generator 56 are illustrated in FIG. 6, other embodiments, such as that illustrated in FIG. 5, may exclude these components in favor of input power from an external power source. The output power of the power converter may, in turn, be routed to a vehicle such as aircraft 12, to provide power to electronic systems of the vehicle. For instance, in the present embodiment, power converter 72 is configured to receive 3-phase 460 VAC power having a frequency of 60 Hz, and to convert this power to 115 VAC output power with a frequency of 400 Hz. It will be appreciated that a number of aircraft are designed to receive and utilize such 115 VAC, 400 Hz power.

However, it will also be appreciated that other vehicles, including other aircraft, utilize power having different characteristics than that provided by power converter 72. For this reason, other power converters, such as power converter 78, may also be desirable. In one embodiment, power converter 78, which includes a control panel 80, is similarly configured to receive 3-phase 460 VAC power and to convert this input power to an output power different than that produced by converter 72, such as 270 VDC power. This output power may then be provided to an aircraft 12 configured to receive such power.

Modular support cart 14, power converter 72, and power converter 78, are advantageously configured in a modular fashion. Particularly, cart 14 is configured to receive either converter 72 or converter 78 depending on the desired output power to be provided. As illustrated in FIG. 5, power converter 72 may be removed from cart 14, as represented by arrow 84. Likewise, power converter 78 may be installed on or within cart 14 in the same position as converter 72, as indicated by arrow 86. The modular nature of cart 14 allows the cart to support a wide variety of aircraft having different power needs and requirements, while avoiding the need to have a separate support cart for each power converter.

Additionally, in certain embodiments, power converters 72 and 78 may be configured for operation independent of modular cart 14. For instance, either or both of converters 72 and 78 can be mounted to support shelves 88. The support shelves 88, in turn, may have or be configured to receive a plurality of wheels or casters 90, which facilitate movement of power converters 72 and 78 when removed from the support cart 14. The modularity of the cart 14 and the power converters 72 and 78 facilitates use of these converters independent of support cart 14. For instance, power converter 72 may be removed from support cart 14 and used as a stand-alone system, thereby allowing the converter to provide power to an aircraft even when cart 14 is unavailable, such as during the performance of maintenance service on cart 14.

Figure 7:
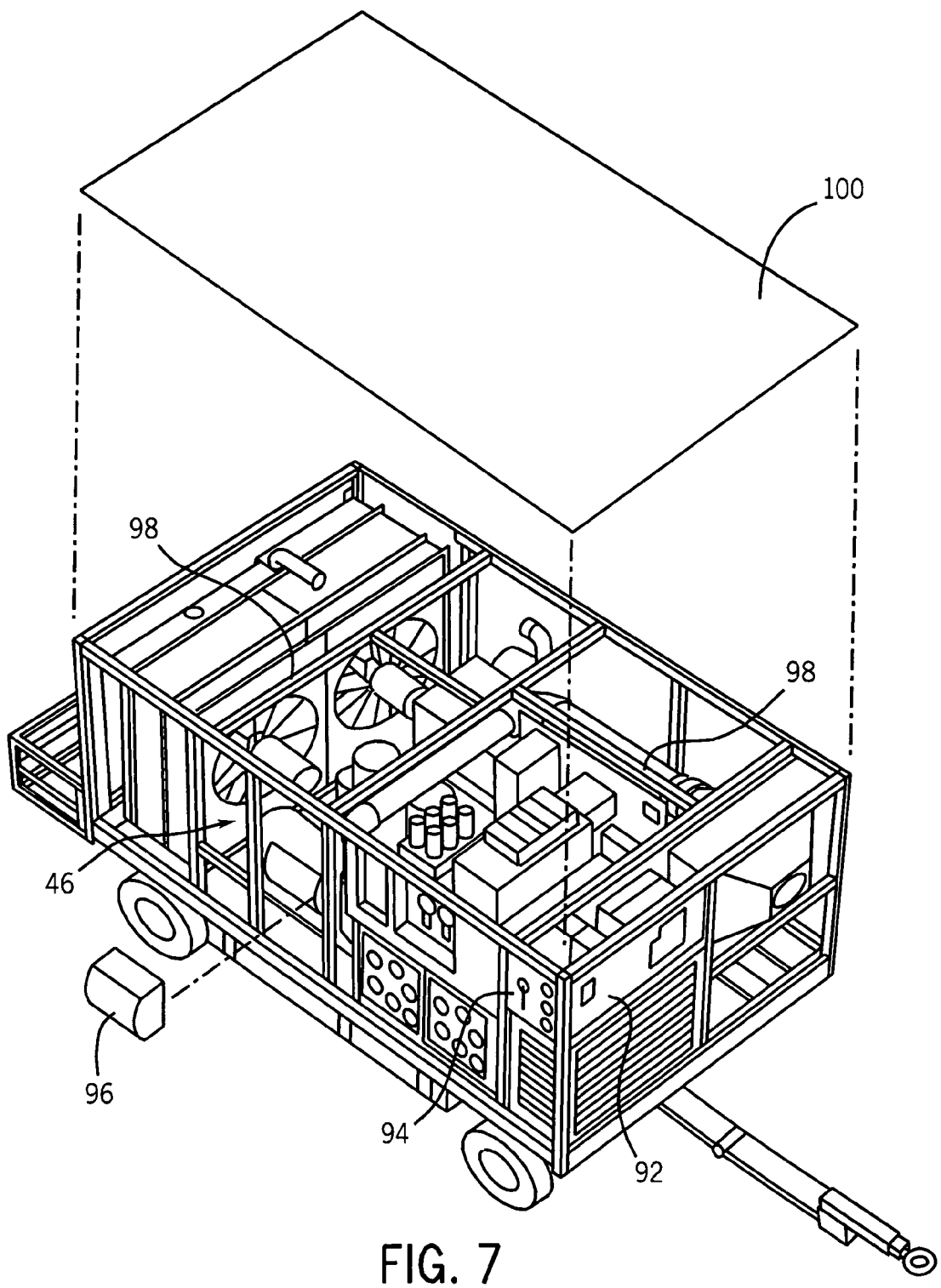
FIG. 7 illustrates the addition of another module to the ground support cart of FIG. 6 in accordance with the present techniques.

Modular support cart 14 may be configured to receive additional components or modules, such as support module 92, as illustrated in FIG. 7. In the present embodiment, module 92 is an additional power converter for providing output power having different characteristics than that provided by power converters 72 and 78. For instance, in one embodiment, power converter 92 is configured to output 28 VDC power. However, in other embodiments, module 92 may be a different component, such as a battery charger for charging operational batteries or starter batteries for various aircraft. Modular support cart 14 may also include switchgear 96 that enables selection of the desired input power source for a modular cart 14 configured to receive input power from both a local source, such as generator 56, and a remote power supply or power grid. Switchgear 96 may be disposed within volume 46 or positioned elsewhere on or within the cart 14. Such switchgear may be included, for example, where the cart may be operated in a hangar or other building where operating the engine is undesirable. Further, cart 14 may also include other components, such as protection circuitry, contactors, and the like, in accordance with the present techniques.

Additionally, in accordance with one embodiment, support cart 14 includes roof support elements 98 and a roof 100. Roof support elements 98 may be configured to be easily removed from the rest of frame 22 to facilitate installation and removal of various components, such as components of air conditioning system 28 and power converters 72 and 78, from the modular support cart 14. Further, roof 100 may be alternatively coupled to and removed from the support elements 98 to protect the various components while increasing the ease with which the components may be installed and removed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A modular ground support system comprising:
   a mobile cart;
   a local power source supported on the mobile cart;
   an air conditioning system supported on the mobile cart and configured for selective coupling to an aircraft to provide conditioned air to the aircraft, wherein the air conditioning system is configured to receive electrical power from the local power source or from an external power source to enable operation of the air conditioning system; and
   a modular power converter for converting a first input power to a first output power, the modular power converter configured to be supported on the mobile cart and for selective coupling to the aircraft, wherein the modular power converter is one of a plurality of modular power converters configured to be interchangeably installed on the mobile cart;
   wherein the modular power converter and the air conditioning system are configured to receive 50 Hz power or 60 Hz power from the local power source or from the external power source, and wherein the modular power converter is configured for removal from the mobile cart and for operation independent of the mobile cart to enable operation of the modular power converter at a first location remote from the mobile cart, and to enable installation of an additional power converter of the plurality of modular power converters onto the mobile cart such that the additional power converter is operable with the mobile cart at a second location.

2. The system of claim 1, wherein the plurality of modular power converters includes at least one of a 400 Hz power converter or a 270 VDC power converter.

3. The system of claim 1, wherein the local power source comprises a diesel engine and a generator supported on the cart.

4. The system of claim 1, comprising switchgear to enable selective switching between the local and external power sources.

5. The system of claim 1, comprising the additional power converter.

6. The system of claim 5, wherein the additional power converter comprises a 28 VDC power converter.

7. The system of claim 1, comprising a battery charger configured to provide power to a battery of a vehicle.

8. The system of claim 1, wherein the system is further configured to provide 120 VAC, 60 Hz power.

9. The system of claim 1, wherein the first input power is 3-phase, 460 VAC power.

10. A modular ground support system comprising:
    a cart configured to receive a plurality of components within an enclosure;
    an air conditioning system configured for mounting to the cart within the enclosure;
    at least one modular, interchangeable electric power converter, wherein the electric power converter includes either a first converter configured to produce a first output power or a second converter configured to produce a second output power different from the first, the first and second converters being interchangeably installable in the cart as options for one another and configured to receive one of 50 Hz power or 60 Hz power to facilitate selective connection of the first and second converters to each of a local power source configured to output 50 Hz or 60 Hz power and a 50 Hz or 60 Hz external power grid.

11. The system of claim 10, wherein the electric power converter is configured to receive 3-phase, 460 VAC power.

12. The system of claim 10, wherein the electric power converter is further configured for operation independent of the cart.

13. The system of claim 12, wherein the electric power converter is configured to receive wheels to facilitate movement of the electric converter when removed from the cart.

14. The system of claim 10, wherein the cart comprises a structural frame, the frame including a removable support segment that is configured to facilitate installation and removal of a component from the cart.

15. The system of claim 14, comprising a removable roof configured for coupling to the frame.

16. The system of claim 10, wherein the air conditioning system is configured to receive power from an external power source.

17. The system of claim 10, comprising a diesel engine and a generator installed on the cart, wherein the generator is configured to be coupled to the electric power converter to provide input power to the electric power converter.

18. The system of claim 10, wherein the first output power is 400 Hz power.

19. The system of claim 18, wherein the second output power is 270 VDC power.

20. A modular ground support system comprising:
a ground support cart configured to receive a plurality of components, wherein the plurality of components includes a power converter, the power converter being either a 400 Hz power converter or a 270 VDC power converter that are interchangeable with one another;
an air conditioning apparatus mounted on the cart, the air conditioning apparatus configured to provide conditioned air to an aircraft;
a diesel engine mounted on the cart; and
a generator mounted on the cart and configured to receive mechanical power from the diesel engine and to generate electrical power for the power converter.

21. The system of claim 20, comprising switchgear to enable selection between power input from the generator and power input from an external power source.

22. A modular ground support system comprising:
a cart configured to receive a plurality of components;
an air conditioning system configured for mounting to the cart; and
a first electric power converter configured to produce a 400 Hz output power; and
a second electric power converter configured to produce a 270 VDC output power;
wherein the first and second converters are configured to be interchangeably mountable to the cart as options for one another and are configured to receive one of 50 Hz power or 60 Hz power to facilitate selective connection of the first and second converters to each of a local power source configured to output 50 Hz or 60 Hz power and a 50 Hz or 60 Hz external power grid to enable one of the first or second converters to receive power from the local power source when disposed in the cart, and to enable operation of the other of the first or second converters independent of the cart via the external power grid.

* * * * *